United States Patent
Pfadler et al.

(10) Patent No.: US 12,507,083 B2
(45) Date of Patent: Dec. 23, 2025

(54) VEHICLE, INFRASTRUCTURE, TRANSCEIVER, APPARATUS, METHOD AND COMPUTER PROGRAM FOR DETERMINING A PHYSICAL LAYER CONFIGURATION FOR A RADIO LINK

(71) Applicants: VOLKSWAGEN AKTIENGESELLSCHAFT, Wolfsburg (DE); BRNO UNIVERSITY OF TECHNOLOGY, Brno (CZ)

(72) Inventors: Andreas Pfadler, Berlin (DE); Jiri Blumenstein, Drevnovice (CZ); Roman Marsalek, Brno (CZ)

(73) Assignees: VOLKSWAGEN AKTIENGESELLSCHAFT (DE); BRNO UNIVERSITY OF TECHNOLOGY (CZ)

( * ) Notice: Subject to any disclaimer, the term of this patent is extended or adjusted under 35 U.S.C. 154(b) by 405 days.

(21) Appl. No.: 17/998,768

(22) PCT Filed: Apr. 28, 2021

(86) PCT No.: PCT/EP2021/061197
§ 371 (c)(1),
(2) Date: Nov. 14, 2022

(87) PCT Pub. No.: WO2021/228558
PCT Pub. Date: Nov. 18, 2021

(65) Prior Publication Data
US 2023/0345265 A1    Oct. 26, 2023

(30) Foreign Application Priority Data
May 12, 2020 (EP) ................................ 20174000

(51) Int. Cl.
*H04W 24/02* (2009.01)
*H04W 4/40* (2018.01)
(Continued)

(52) U.S. Cl.
CPC ............. *H04W 24/02* (2013.01); *H04W 4/40* (2018.02); *H04W 24/08* (2013.01); *H04W 64/00* (2013.01)

(58) Field of Classification Search
None
See application file for complete search history.

(56) References Cited

U.S. PATENT DOCUMENTS 10,790,927 B2    9/2020  Alieiev et al.
11,763,695 B2 *  9/2023  Van Putten .............. G09B 9/54
                                                       434/2

(Continued)

FOREIGN PATENT DOCUMENTS

CN    104472004 A    3/2015
CN    110120849 A    8/2019

(Continued)

OTHER PUBLICATIONS

Al-Janabi et al.; Adaptive MCS Selection in OFDM Systems Based on Channel Frequency Coherence; 2009 Fifth Advanced International Conference on Telecommunications; Venice; 2009; pp. 177-182.

(Continued)

*Primary Examiner* — Christopher M Crutchfield
(74) *Attorney, Agent, or Firm* — BARNES & THORNBURG LLP

(57) ABSTRACT

A transportation vehicle, infrastructure, a transceiver, an apparatus, a method, and a computer program for determining a physical layer configuration for a radio link for a communication system. The method for determining a (Continued)

physical layer configuration for a radio link at a first transceiver to communicate with a second transceiver via the radio link includes obtaining information related to an environment and a state of movement of the first and second transceivers, estimating a radio condition of the radio link based on the information related to the environment and the state of movement of the first and second transceivers, and determining the physical layer configuration for the radio link based on the radio condition.

18 Claims, 3 Drawing Sheets

(51) Int. Cl.
*H04W 24/08* (2009.01)
*H04W 64/00* (2009.01)

(56) References Cited

U.S. PATENT DOCUMENTS

| | | | |
|---|---|---|---|
| 2009/0082002 A1* | 3/2009 | Kim | H04W 48/12 455/418 |
| 2015/0173100 A1 | 6/2015 | Aydin et al. | |
| 2016/0080961 A1 | 3/2016 | Kim et al. | |
| 2017/0041760 A1 | 2/2017 | Alieiev et al. | |
| 2017/0295596 A1 | 10/2017 | Chen et al. | |
| 2019/0140850 A1* | 5/2019 | Ambrosin | H04W 12/06 |
| 2019/0297173 A1* | 9/2019 | Nunna | H04L 69/08 |
| 2019/0319868 A1 | 10/2019 | Svennebring et al. | |
| 2019/0327716 A1* | 10/2019 | Wang | H04B 17/364 |
| 2020/0007247 A1 | 1/2020 | Gulati et al. | |
| 2020/0064864 A1 | 2/2020 | Franchi et al. | |
| 2020/0120458 A1* | 4/2020 | Aldana | H04W 28/16 |
| 2020/0228247 A1* | 7/2020 | Guo | H04L 1/0025 |
| 2021/0168861 A1* | 6/2021 | Lee | H04W 74/0808 |
| 2021/0266715 A1* | 8/2021 | Uchiyama | H04W 4/48 |
| 2021/0320766 A1* | 10/2021 | Li | H04L 5/0048 |
| 2022/0130236 A1* | 4/2022 | Reimann | H04B 7/0626 |
| 2022/0279549 A1* | 9/2022 | Takahashi | H04L 5/0044 |
| 2022/0363254 A1* | 11/2022 | Baek | B60K 35/80 |

FOREIGN PATENT DOCUMENTS

| | | |
|---|---|---|
| CN | 110858960 A | 3/2020 |
| EP | 3525374 A1 | 8/2019 |
| EP | 3579465 A1 | 12/2019 |
| EP | 3611891 A1 | 2/2020 |
| KR | 20110071793 A | 6/2011 |
| WO | 2019192684 A1 | 10/2019 |

OTHER PUBLICATIONS

Interdigital; On NR Uu enhancement for advanced V2X use cases; 3rd Generation Partnership Project (3GPP); Mobile Competence Centre; Feb. 16, 2019; vol. RAN WG1; Athens Greece.
Ihua et al.; LDPC coded AMC based on decoding iteration times for OFDM systems; VTC Spring 2008; IEEE Vehicular Technology Conference; 2008; pp. 1157-1161; Singapore.
Search Report; European Patent Application No. 20174000.8; Oct. 15, 2020.
Search Report; International Patent Application No. PCT/EP2021/061197; Jul. 23, 2021.
Office Action; Chinese Patent Application No. 202180034620.5; Jun. 28, 2024.

\* cited by examiner

US 12,507,083 B2

VEHICLE, INFRASTRUCTURE, TRANSCEIVER, APPARATUS, METHOD AND COMPUTER PROGRAM FOR DETERMINING A PHYSICAL LAYER CONFIGURATION FOR A RADIO LINK

PRIORITY CLAIM

This patent application is a U.S. National Phase of International Patent Application No. PCT/EP2021/061197, filed 28 Apr. 2021, which claims priority to European Patent Application No. 20174000.8, filed 12 May 2020, the disclosures of which are incorporated herein by reference in their entireties.

SUMMARY

Illustrative embodiments relate to a transportation vehicle, infrastructure, a transceiver, an apparatus, a method, and a computer program for determining a physical layer configuration for a radio link for a communication system, more particularly, but not exclusively, to a concept for more efficiently determining a physical layer configuration using environmental and state of movement information of a transceiver in a mobile communication system.

BRIEF DESCRIPTION OF THE DRAWINGS

Disclosed embodiments will be described in more detail below with reference to the drawings, in which.

DETAILED DESCRIPTION

Figure 1:
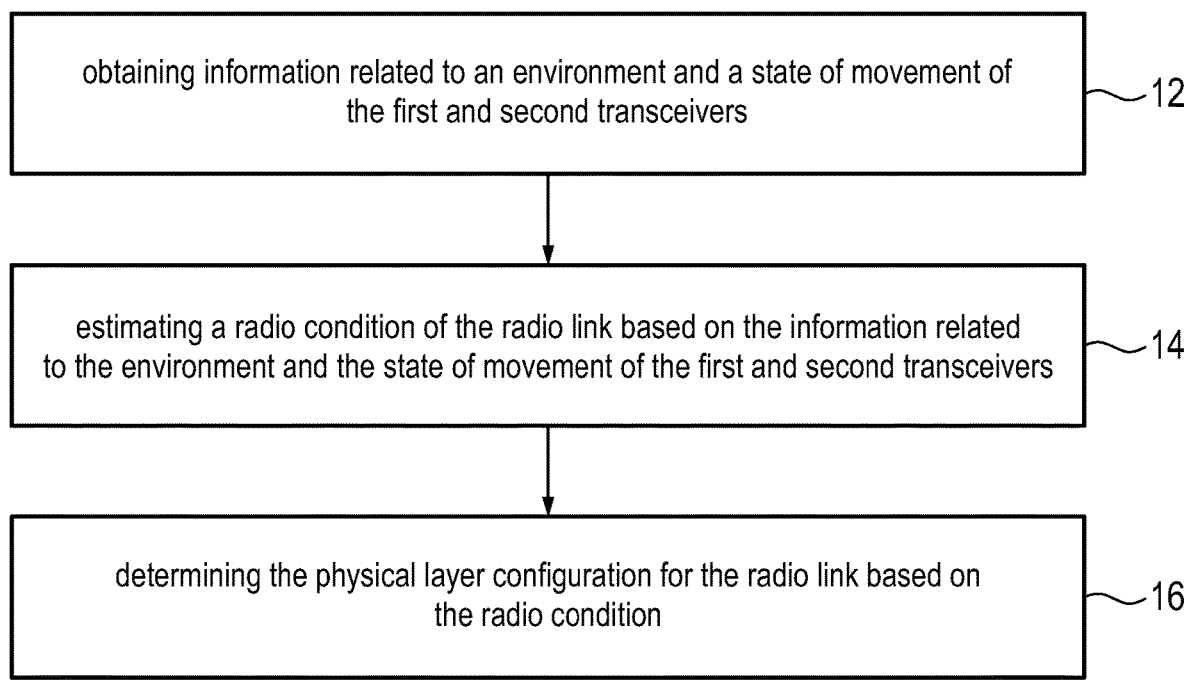
FIG. 1 illustrates a block diagram of an exemplary embodiment of a disclosed method for determining a physical layer configuration for a radio link at a first transceiver to communicate with a second transceiver via the radio link.

Physical layer configurations of modern mobile communication system become more and more adaptable. To adapt to the vastly changing radio environment more and more parameters can be adjusted to achieve high spectral efficiency. Most of the mobile communication systems use reference signaling to enable channel estimation, which forms a basis for parameter adjustments such as modulation and coding configurations.

Document US 2020/0007247 A1 describes a concept in which a first apparatus communicates with a second apparatus, including transmitting or receiving a first transmission. The first apparatus receives information about the second apparatus from a sensor at the first apparatus and/or from a BSM (basic safety message). The apparatus determines whether the first apparatus and the second apparatus are in a LOS (line-of-sight) condition based on a correlation of the information with one or more of a channel estimation, PMI (precoder matrix index) feedback, or RI (rank indicator) feedback. The apparatus may adapt a transmission parameter for a second transmission based on a predicted location of the first apparatus or the second apparatus.

Document US 2016/0080961 A1 relates to a pre-5th-Generation (5G) or 5G communication system to be provided for supporting higher data rates beyond 4th-Generation (4G) communication system such as Long Term Evolution (LTE). A filter bank-based channel state report and resource allocation method and an apparatus for use in a wireless communication system are provided. The channel state report method of a receiver in a filter bank-based wireless communication system includes receiving filter bank information on at least two filter banks from a transmitter, measuring a channel state of each of at least two filter banks based on the filter bank information, and transmitting channel state information, which is generated based on the measurement result, to the transmitter.

Document EP 3611 891 A1 relates to a signal processing apparatus and method that can reduce deterioration in reception sensitivity. A received signal is corrected using channel information obtained from a plurality of frequency samples being significant components that are extracted from frequency samples of known information included in the received signal. The concept can be applied to, for example, a signal processing apparatus, a transmission device, a reception device, a transceiver device, a communication device, an information processing apparatus, an electronic apparatus, a computer, a program, a storage medium, a system, and the like.

Document EP 3579465 A1 provides a method for determining a modulation and coding scheme (MCS) to be applied to data in a wireless communication system, and a device therefor. Specifically, the method may comprise the operations of: reporting, to a base station, channel state information including a first measurement value related to a channel state between a terminal and a base station; receiving at least one downlink reference signal from the base station; calculating a second measurement value related to the channel state by using the received at least one downlink reference signal; when the second measurement value is equal to or smaller than a preconfigured threshold value in comparison with the first measurement value, transmitting, to the base station, a specific uplink signal requesting a change of an MCS designated to downlink data; and receiving the downlink data, to which the changed MCS has been applied, from the base station.

Document WO 2019/192684 A1 discloses a technique for radio transmitting data. As to a method facet of the technique data to be transmitted to a receiver is represented by at least two partial modulation symbols. Each of the at least two partial modulation symbols is associated to a different layer of the radio transmission to the receiver. A modulation symbol is generated by combining the at least two partial modulation symbols at different power levels according to the associated layer. The modulation symbol is transmitted to the receiver.

Document US 2019/0319868 A1 discusses various systems and methods for determining and communicating Link Performance Predictions (LPPs), such as in connection with management of radio communication links. The LPPs are predictions of future network behaviors/metrics (e.g., bandwidth, latency, capacity, coverage holes, etc.). The LPPs are communicated to applications and/or network infrastructure, which allows the applications/infrastructure to make operational decisions for improved signaling/link resource utilization. In disclosed embodiments, the link performance analysis is divided into multiple layers that determine their own link performance metrics, which are then fused together to make an LPP. Each layer runs different algorithms, and provides respective results to an LPP layer/engine that fuses the results to obtain an LPP.

Document EP 3525374 A1 reveals a method comprising the operations of observing the surroundings of a transmitting participant and determining the position and motion of the communication participants. Further, the method comprises estimating transmission conditions at a later point in time and classify the data for data communication in different categories. The categories determining susceptibility of the data to transmission errors.

INTERDIGITAL INC: "On NR Uu enhancement for advanced V2X use cases", 3GPP DRAFT; R1-1902602, 16 Feb. 2019, XP051600295 contribution discusses views on the NR Uu for advanced V2X use cases. It is discussed to support NR V2X advanced use cases, UE reports more details (e. g., the range) of message size of Uu V2X periodic traffic to gNB. Further, it is discussed to handle dynamic change of Doppler frequency and support faster handover, UE reports speed and moving direction information to gNB.

Document KR 2011 0071793 A reveals an adaptive modulation and a coding method which is suitable for wireless transfer environment. The adaptive modulation and coding operating apparatus applies active AMC (Active Adaptive Modulation and Coding) technique or manual AMC (Passive Adaptive Modulation and Coding) technique to data information transmitted and received in the communications between the communications between the transportation vehicle and the road side unit.

Document US 2017/041760 A1 reveals a method for adapting at least one parameter of a communication system between two subscribers, wherein at least one subscriber is mobile. In this case a current position of the mobile subscriber is determined at a time and a channel quality for a future time is estimated on the basis of the current position using an environmental model.

Document US 2017/295596 A1 reveals a base station, which may differentiate, determine, configure, employ and/ or allocate a first physical random access channel (PRACH) resource set and a second PRACH resource set. The first PRACH resource set to be used by user equipments (UEs) experiencing a higher Doppler condition than UEs using the second PRACH resource set. The base station may transmit an indication of the first PRACH resource set and the second PRACH resource set to the UE.

There is a demand for an improved physical layer adaptation/configuration concept in a mobile communication system.

This demand is accommodated by the subject-matter of the independent claims.

Disclosed embodiments are based on the finding, that conventional link adaptation methods mostly utilize a Signal-to-Noise Ratio (SNR) knowledge for selection of the most appropriate modulation and coding scheme (MCS). In some situations, the adaptation of modulation and coding schemes based purely on such metrics can lead to inadequate actions, e.g., decreasing the modulation order instead of increasing a density of channel estimation pilots. Disclosed embodiments are based on the finding that not only the MCS can be adapted but a more complete set of physical layer parameters. Moreover, an initial parameter set is chosen based on the knowledge of actual parameters of the environment and a state of movement of a transceiver.

Disclosed embodiments provide a method for determining a physical layer configuration for a radio link at a first transceiver to communicate with a second transceiver via the radio link. The method comprises obtaining information related to an environment and a state of movement of the first and second transceivers. The method comprises estimating a radio condition of the radio link based on the information related to the environment and the state of movement of the first and second transceivers. The method further comprises determining the physical layer configuration for the radio link based on the radio condition. Considering a state of movement of the transceivers and environmental information a more appropriate and efficient estimation of a radio condition of a radio link may be enabled and therewith a more appropriate choice of a physical layer configuration.

For example, the obtaining of the information related to the environment and the state of movement of the first and second transceivers comprises evaluating sensor data of the first transceiver. Sensor data available at a transceiver may provide a basis for determining environmental data and information on the state of movement of the transceiver. Sensor data may be available at the transceiver and may therefore form an efficient basis for radio condition estimation as it does not need be communicated using valuable air interface resources.

In some exemplary embodiments the obtaining of the information related to the environment and the state of movement of the first and second transceivers comprises evaluating an environmental model of the first transceiver. A transceiver may model its environment using sensor or other data available. In the environmental model there may be static and dynamic objects, which also affect the radio environment. Disclosed embodiments may improve the estimation of the radio condition by taking the environmental model into account, e.g., with respect to moving reflectors in the environment.

The information related to the environment and the state of movement of the first and second transceivers may comprise an environmental map of the first transceiver. The environmental map may further contribute to a better understanding of the radio environment, which may further improve estimation of the radio condition.

Moreover, at least in some exemplary embodiments the obtaining of the information related to the environment and the state of movement of the first and second transceivers may comprise receiving broadcast messages from traffic participants. Such messages may be communicated on a regular basis, e.g., cyclically or periodically, among traffic participants. The knowledge about a status, e.g., location, speed, travel direction, of traffic participants may contribute to a better knowledge of the environment condition and may therefore enable improved estimation of the radio condition.

The information related to the environment and the state of movement of the first and second transceivers may comprises at least one element of the group of positions of the first and second transceivers, a relative speed between the first and second transceivers, a mutual distance of the first and second transceivers, and distances of other transceivers and/or other physical objects. The more detailed the information on the state of movement and the environment the better the radio condition estimation.

For example, the estimating of the radio condition comprises estimating a Doppler shift based on a relative movement between the first and the second transceivers. The Doppler shift may relate to a density configuration of reference symbols for the physical layer configuration in an exemplary embodiment.

The physical layer configuration may comprise at least one element of the group of a subcarrier spacing, a pilot symbol configuration in time and/or frequency, a time slot duration, a modulation order, and coding parameters. In disclosed embodiments, a physical layer configuration may be highly adaptive and a variety of physical layer parameters may be set.

The physical layer configuration may be an initial physical layer configuration and the method may further comprise fine tuning the physical layer configuration during communication on the radio link. In line with the above, an initial physical layer configuration may be better adapted to the real radio conditions through consideration of environmental information and a state of movement of the first and/or second transceivers.

The physical layer configuration may be a random access configuration. Radio transmission may be more efficient as exemplary embodiments may enable to adapt a physical layer configuration for random access in a better way to the actual radio conditions.

In disclosed embodiments the first transceiver may be a transportation vehicle and the second transceiver may be a transportation vehicle or infrastructure of a mobile communication system. Disclosed embodiments may exploit the environmental information available at a transportation vehicle.

Disclosed embodiments further provide a computer program having a program code for performing one or more of the above described methods, when the computer program is executed on a computer, processor, or programmable hardware component. A further exemplary embodiment is a computer readable storage medium storing instructions which, when executed by a computer, processor, or programmable hardware component, cause the computer to implement one of the methods described herein.

Another exemplary embodiment is an apparatus for determining a physical layer configuration for a radio link at a first transceiver to communicate with a second transceiver via the radio link. The apparatus comprises a transmitter module for communicating with the second transceiver and a control module configured to control the transmitter module, and to perform one of methods described herein. Another exemplary embodiment is a transportation vehicle comprising the apparatus. A further exemplary embodiment is infrastructure of a mobile communication system, e.g., a base station, an access point or a NodeB, comprising the apparatus.

Various example embodiments will now be described more fully with reference to the accompanying drawings in which some example embodiments are illustrated. In the figures, the thicknesses of lines, layers or regions may be exaggerated for clarity. Optional components may be illustrated using broken, dashed or dotted lines.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like or similar elements throughout the description of the figures.

As used herein, the term "or" refers to a non-exclusive or, unless otherwise indicated (e.g., "or else" or "or in the alternative"). Furthermore, as used herein, words used to describe a relationship between elements should be broadly construed to include a direct relationship or the presence of intervening elements unless otherwise indicated. For example, when an element is referred to as being "connected" or "coupled" to another element, the element may be directly connected or coupled to the other element or intervening elements may be present.

In contrast, when an element is referred to as being "directly connected" or "directly coupled" to another element, there are no intervening elements present. Similarly, words such as "between", "adjacent", and the like should be similarly interpreted.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "includes" or "including", when used herein, specify the presence of stated features, integers, operations, elements or components, but do not preclude the presence or addition of one or more other features, integers, operations, elements, components or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

FIG. 1 illustrates a block diagram of a flowchart of a method 10 for determining a physical layer configuration for a radio link at a first transceiver to communicate with a second transceiver via the radio link. The method 10 comprises obtaining 12 information related to an environment and a state of movement of the first and second transceivers and estimating 14 a radio condition of the radio link based on the information related to the environment and the state of movement of the first and second transceivers. The method further comprises determining 16 the physical layer configuration for the radio link based on the radio condition.

Figure 2:
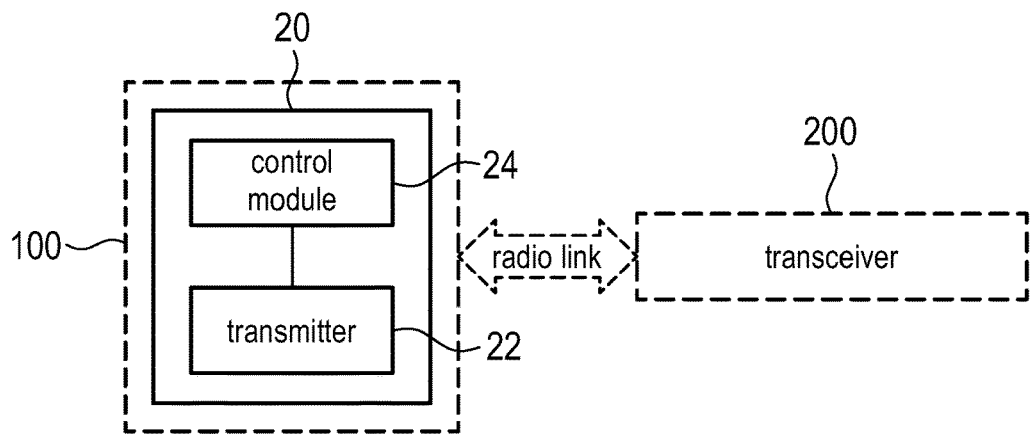
FIG. 2 illustrates a block diagram of an exemplary embodiment of a disclosed apparatus for determining a physical layer configuration for a radio link at a first transceiver to communicate with a second transceiver and an exemplary embodiment of a disclosed transportation vehicle or infrastructure.

FIG. 2 illustrates a block diagram of an exemplary embodiment of an apparatus 20 for determining a physical layer configuration for a radio link at a first transceiver 100 to communicate with a second transceiver 200. The apparatus 20 comprises a transmitter module 22 for communicating with the second transceiver 200 and a control module 24, which is coupled with the transmitter module 22. The control module 24 is configured to control the transmitter module 22 and to perform the method 10 as described herein. FIG. 2 further illustrates an exemplary embodiment of the first transmitter 100 comprising an exemplary embodiment of the apparatus 20. Further disclosed embodiments are a transportation vehicle or infrastructure of a mobile communication system comprising the first transceiver 100. The second transceiver 200 may as well comprise an exemplary embodiment of the apparatus 20. FIG. 2 also illustrates an exemplary embodiment of a communication system 300 with the first and second transceivers 100, 200.

The transmitter module 22 may also comprise receiver features and may hence be a transceiver module. It may be implemented as any method or mechanism for transmitting, receiving or transceiving, i.e., receiving and/or transmitting etc., one or more transmitter/receiver units, one or more transmitter/receiver devices and it may comprise typical receiver and/or transmitter components, such as one or more elements of the group of one or more Low-Noise Amplifiers (LNAs), one or more Power Amplifiers (PAs), one or more filters or filter circuitry, one or more diplexers, one or more duplexers, one or more Analog-to-Digital converters (A/D), one or more Digital-to-Analog converters (D/A), one or more modulators or demodulators, one or more mixers, one or more antennas, etc. In some disclosed embodiments, the control module 24 may provide some functionality that may be found in transceiver modules. For example, the control module 24 may be a processing module of the transmitter/receiver/transceiver module 22 and may comprise one or more filters or filter circuitry and/or one or more modulators or demodulators.

In exemplary embodiments the control or processing/control module 24 may be implemented using one or more processing units, one or more processing devices, any method or mechanism for processing, such as a processor, a computer or a programmable hardware component being operable with accordingly adapted software. In other words, the described function of the processing or control module 24 may as well be implemented in software, which is then executed on one or more programmable hardware components. Such hardware components may comprise a general-purpose processor, a Digital Signal Processor (DSP), a micro-controller, etc. The respective processing or control module 24 may be configured to carry out any of the methods described herein.

The first and second transceivers 100, 200 may be any devices of a wireless communication system 300, e.g., a mobile communication system, a broadcast system, a unicast system etc.

The mobile communication system 300 may, for example, be an Orthogonal Time Frequency Space (OTFS) system or one of the Third Generation Partnership Project (3GPP)-standardized mobile communication networks, where the term mobile communication system is used synonymously to mobile communication network. The mobile or wireless communication system may correspond to a mobile communication system of the 5th Generation (5G) and may use mm-Wave technology. The mobile communication system may correspond to or comprise, for example, a Long-Term Evolution (LTE), an LTE-Advanced (LTE-A), High Speed Packet Access (HSPA), a Universal Mobile Telecommunication System (UMTS) or a UMTS Terrestrial Radio Access Network (UTRAN), an evolved-UTRAN (e-UTRAN), a Global System for Mobile communication (GSM) or Enhanced Data rates for GSM Evolution (EDGE) network, a GSM/EDGE Radio Access Network (GERAN), or mobile communication networks with different standards, for example, a Worldwide Inter-operability for Microwave Access (WIMAX) network IEEE 802.16 or Wireless Local Area Network (WLAN) IEEE 802.11, generally an Orthogonal Frequency Division Multiple Access (OFDMA) network, a Time Division Multiple Access (TDMA) network, a Code Division Multiple Access (CDMA) network, a Wideband-CDMA (WCDMA) network, a Frequency Division Multiple Access (FDMA) network, a Spatial Division Multiple Access (SDMA) network, etc.

A base station transceiver or infrastructure can be operable or configured to communicate with one or more active mobile transceivers and a base station transceiver can be located in or adjacent to a coverage area of another base station transceiver, e.g., a macro cell base station transceiver or small cell base station transceiver. Hence, disclosed embodiments may provide a mobile communication system 300 comprising two or more mobile transceivers and one or more base station transceivers, wherein the base station transceivers may establish macro cells or small cells, as e.g., pico-, metro-, or femto cells. A mobile transceiver may correspond to a smartphone, a cell phone, user equipment, a laptop, a notebook, a personal computer, a Personal Digital Assistant (PDA), a Universal Serial Bus (USB)-stick, a car, a vehicle, etc. A mobile transceiver may also be referred to as User Equipment (UE) or mobile in line with the 3GPP terminology. A transportation vehicle may correspond to any conceivable method or mechanism for transportation, e.g., a car, a bike, a motorbike, a van, a truck, a bus, a ship, a boat, a plane, a train, a tram, etc.

A base station transceiver can be located in the fixed or stationary part of the network or system. A base station transceiver may correspond to a remote radio head, a transmission point, an access point, a macro cell, a small cell, a micro cell, a femto cell, a metro cell etc. A base station transceiver can be a wireless interface of a wired network, which enables transmission of radio signals to a UE or mobile transceiver. Such a radio signal may comply with radio signals as, for example, standardized by 3GPP or, generally, in line with one or more of the above listed systems. Thus, a base station transceiver may correspond to a NodeB, an eNodeB, a Base Transceiver Station (BTS), an access point, a remote radio head, a relay station, a transmission point etc., which may be further subdivided in a remote unit and a central unit.

A mobile transceiver can be associated with a base station transceiver or cell. The term cell refers to a coverage area of radio services provided by a base station transceiver, e.g., a NodeB (NB), an eNodeB (eNB), a remote radio head, a transmission point, etc. A base station transceiver may operate one or more cells on one or more frequency layers, in some Exemplary embodiments a cell may correspond to a sector. For example, sectors can be achieved using sector antennas, which provide a characteristic for covering an angular section around a remote unit or base station transceiver. In some disclosed embodiments, a base station transceiver may, for example, operate three or six cells covering sectors of 120° (in case of three cells), 60° (in case of six cells) respectively. A base station transceiver may operate multiple sectorized antennas.

In the following a cell may represent an according base station transceiver generating the cell or, likewise, a base station transceiver may represent a cell the base station transceiver generates.

Mobile transceivers may communicate directly with each other, i.e., without involving any base station transceiver, which is also referred to as Device-to-Device (D2D) communication. An example of D2D is direct communication between transportation vehicles, also referred to as Vehicle-to-Vehicle communication (V2V). To do so radio resources are used, e.g., frequency, time, code, and/or spatial resources, which may as well be used for wireless communication with a base station transceiver. The assignment of the radio resources may be controlled by the base station transceiver, i.e., the determination which resources are used for D2D and which are not. Here and in the following radio resources of the respective components may correspond to any radio resources conceivable on radio carriers and they may use the same or different granularities on the respective carriers. The radio resources may correspond to a Resource Block (RB as in LTE/LTE-A/LTE-unlicensed (LTE-U)), one or more carriers, sub-carriers, one or more radio frames, radio sub-frames, radio slots, one or more code sequences potentially with a respective spreading factor, one or more spatial resources, such as spatial sub-channels, spatial precoding vectors, any combination thereof, etc.

For example, direct Cellular Vehicle-to-Anything (C-V2X), where V2X includes at least V2V, V2-Infrastructure (V2I), etc., transmission according to 3GPP Release 14 can be managed by infrastructure (so-called mode 3) or run in a User Equipment (UE) Autonomous mode (UEA), (so-called mode 4). In exemplary embodiments mobile transceivers may be registered in the same mobile communication system 300. In other disclosed embodiments one or more of the two or more mobile transceivers may be registered in different mobile communication systems 300. The different mobile communication systems 300 may use the same access technology but different operators or they may use different access technologies as outlined above.

In exemplary embodiments the physical layer configuration may comprise any parameters which can be configured in respect of the physical layer. The physical layer configuration may comprise at least one element of the group of a subcarrier spacing, a pilot symbol configuration in time and/or frequency, a time slot duration, a modulation order, and coding parameters. A physical layer configuration may comprise parameters that influence or set one or more elements of the group of a time division duplex scheme, a frequency division duplex scheme, a code division duplex scheme, a spatial division duplex scheme, and an orthogonal frequency division multiplexing scheme. The physical layer configuration may comprise at least an orthogonal frequency division multiplexing component. For example, the physical layer data channel configuration may comprise information on a subcarrier bandwidth configuration for the orthogonal frequency division multiplexing component. Such a configuration may involve the indication or configuration of further parameters, for example, symbol duration, cyclic prefix duration, time transmission interval (TTI) length, subcarrier spacing, etc. The physical layer data channel configuration may comprise information on a numerology defined for the mobile communication system.

Information related to an environment may be an environmental model, which is a digital model of the environment of the first transceiver, which can be based on sensor data or on exchanged messages with other transceivers. For example, the first transceiver may be a transportation vehicle, which can be equipped with multiple sensors, such as visual/optical (camera), radar, ultrasonic, lidar (light detection and ranging), etc. A transportation vehicle may model its surroundings using this sensor data. At least in some disclosed embodiments such a model may be based on known static data, e.g., as map data comprising a course of one or more roads, intersections, traffic infrastructure (lights, signs, crossings, etc.), buildings, etc. Such a basic layer for the environmental model may be complemented by dynamic or moving objects detected through sensor data. Such a sensor data-based environmental model may form the basis for the second environmental map.

An environmental map may comprise static and dynamic objects in the environment of the transportation vehicle/traffic entity along at least a part of the transportation vehicle's trajectory. Such a part of the trajectory may be, for example, the part the transportation vehicle is planning to travel in the next 30 s, 1 minute, 5 minutes, 10 minutes, etc. A dynamic object is one that is not permanently static/fixed such as other road participants, pedestrians, vehicles, but also semi-static objects such as components of a moving construction side, traffic signs for road or lane narrowing, etc. For example, such dynamic objects may be other transportation vehicles, pedestrians, bicycles, road participants, etc. When determining the environmental model not all objects in the model may be determined with the same confidence. There are objects for which a higher certainty can be achieved than for others. For example, if multiple sensors can identify or confirm a certain object its presence and/or state of movement can potentially be determined with a higher confidence compared to a case in which only data from a single sensor is indicative of an object. Similar considerations apply with respect to a message-based map. If there is an object in the environment multiple traffic participants report on, a higher confidence results as compared to the case in which only a single road participant reports on the object.

In the following an exemplary embodiment will be described, which enables a 5G NR physical layer adaptation.

After a cold start of a cellular network user equipment (UE), when the equipment has no knowledge on its environment, its physical layer parameters may be adjusted according to estimated link quality variables such as bit-to error ratio (BER), data throughput or signal-to-noise ratio (SNR). Those link quality parameters can be derived from an initial handshaking transmission that requires measurement time duration, which may be reduced in disclosed embodiments. When the derived parameters (SNR, BER etc.) are not within an appropriate range (due to sharp transitions of coded BER curves), this handshaking transmission may be repeated with other modulation and coding scheme parameters. This process may result in an iterative mechanism ending up with a set of parameters, which will ensure quasi error free transmission with the lowest possible redundancy and robustness. More iterations of the above-mentioned action lead to a higher probability of achieving an appropriate set of modulation and coding parameters, however, generate increasing latency together with reduction of the achievable data throughput. In exemplary embodiments the number of iterations may be reduced. In some disclosed embodiments the iteration may even be avoided.

Moreover, monitoring of the link quality metrics, i.e., BER, SNR and/or throughput does not provide full information about the reason why the link quality is eventually degraded. Low link quality may be caused by a variety of effects—from multipath propagation or high relative movement between transmitter and receiver to outdated channel state information (CSI) or even adjacent channel emissions. In some situations, the adaptation of modulation and coding schemes based purely on such metrics can lead to inadequate actions, e.g., decreasing the modulation order instead of increasing of density of channel estimation pilots.

Considering the concept of vehicular communication, the communication links between an ego-vehicle and a base station (BS) and/or transportation vehicles in the relevant surrounding are going to exhibit a Doppler frequency shift, which is determined before the actual transmission of the built-in user equipment begins. Such frequency shift is relatively easy to compensate in the pure line-of-sight links, but its full compensation in the presence of multipath propagation is still challenging task.

The estimating 14 of the radio condition may comprise estimating a Doppler shift based on a relative movement between the first and the second transceivers.

Disclosed embodiments may provide a benefit of acquiring optimal or improved physical layer settings when the cellular user equipment is integrated to an electronic system of a transportation vehicle. The first transceiver may be a transportation vehicle and the second transceiver may be a transportation vehicle or infrastructure of a mobile communication system 300. As such, the transportation vehicle is considered to have at its disposal a knowledge of its position and relevant surroundings. This knowledge is obtained from active or passive sensors such as built-in radars, cameras, lidars, high-accuracy positioning system and high definition maps (HD maps). In the method 10 the obtaining 12 of the information related to the environment and the state of movement of the first and second transceivers may comprise evaluating sensor data of the first transceiver. For example, the obtaining 12 of the information related to the environment and the state of movement of the first and second transceivers comprises evaluating an environmental model of the first transceiver. Furthermore, at least in some exemplary embodiments the obtaining 12 of the information related to the environment and the state of movement of the first and second transceivers may comprise receiving broadcast messages from traffic participants.

In some exemplary embodiments the information related to the environment and the state of movement of the first and second transceivers comprises an environmental map of the first transceiver. It may include
  (1) positions of other transportation vehicles and/or BS,
  (2) their speed relative to the ego-vehicle, and
  (3) mutual distances of the transportation vehicles and distances between transportation vehicles and other physical objects.

For example, in disclosed embodiments the information related to the environment and the state of movement of the first and second transceivers comprises at least one element of the group of positions of the first and second transceivers, a relative speed between the first and second transceivers, a mutual distance of the first and second transceivers, and distances of other transceivers and/or other physical objects.

Because the BER and SNR strongly correlates with Doppler shifts and distances respectively, exemplary embodiments may adapt the physical layer parameters from the mentioned quantities, i.e.:
  (1) positions of other transportation vehicles,
  (2) their speed relative to the ego-vehicle, and
  (3) mutual distances of the transportation vehicles and distances between transportation vehicles and other physical objects.

The benefit of at least some disclosed embodiments is that the modulation and coding parameters are optimized before the actual transmission and therefore latency is reduced, and data throughput is increased.

The quantities (1)-(3) for optimization/improvement of an itemized set of physical layer link parameters, can be:
  subcarrier spacing, proportional to maximal expected Doppler shift,
  density of pilots for channel estimation in time and frequency domain, proportional to maximal expected Doppler shift,
  time-slot duration, inversely proportional to maximal expected Doppler shift,
  modulation order, inversely proportional to maximal expected Doppler shift, and
  forward error correction (FEC) coder parameters (code rate), inversely proportional to maximal expected Doppler shift.

Figure 3:
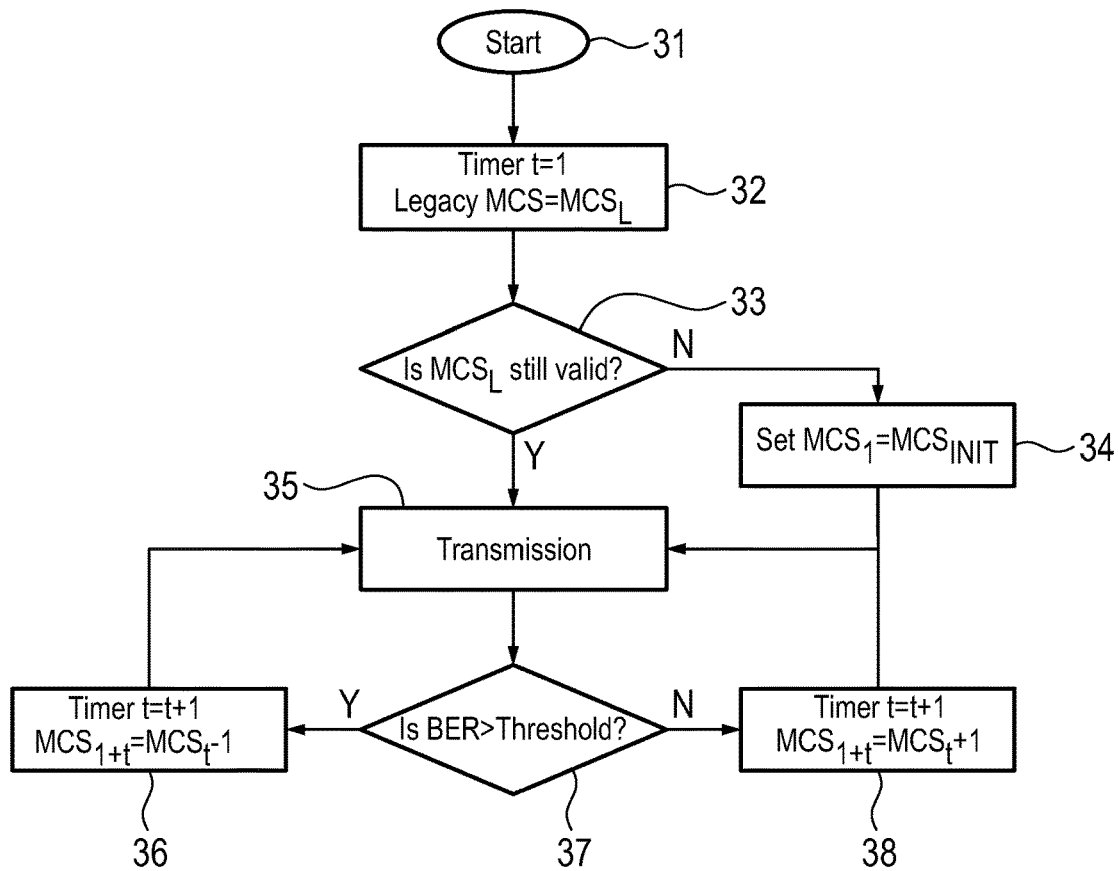
FIG. 3 illustrates a block diagram of a flow chart of a disclosed method for selecting a modulation and coding scheme in an exemplary embodiment.

FIG. 3 illustrates a block diagram of flow chart of a method for selecting a modulation and coding scheme in an exemplary embodiment. This flowchart shows conventional link estimation, which may be eased using disclosed embodiments. The flowchart shows proposed 5G NR physical layer adaptation and it starts in operation at 31. In operation at 32 a timer t is set to 1 and a legacy modulation and coding scheme (MCS) parameter is set to MCSL. In operation at 33 it is checked whether MCSL is still valid and if so, transmission is carried out in operation at 35. If not MCS1 is set to MCSINIT in operation at 34, which is an initial value and transmission is carried out in operation at 35. In operation at 37 BER is evaluated against a threshold. If BER is above the threshold 37 (too many errors) the timer is increased t=t+1 and the next MCS1+t is set to MCSt−1 (more robust MCS) in operation at 36. If BER is below the threshold 37 (more errors affordable) the timer is increased t=t+1 and the next MCS1+t is set to MCSt+1 (higher spectral efficiency) in operation at 38.

More details on conventional link adaptation methods can be found in L. Lihua, Z. Mingyu, X. Yongtai, W. Haifeng and Z. Ping, "LDPC Coded AMC Based on Decoding Iteration Times for OFDM Systems," VTC Spring 2008—IEEE Vehicular Technology Conference, Singapore, 2008, pp. 1157-1161, doi: 10.1109A/ETECS.2008.245, and M. S. Al-Janabi, C. C. Tsimenidis, B. S. Sharif and S. Y. L. Goff, "Adaptive MCS Selection in OFDM Systems Based on Channel Frequency Coherence," 2009 Fifth Advanced International Conference on Telecommunications, Venice, 2009, pp. 177-182. doi: 10.1109/AICT.2009.37, which describe the principle of the operations depicted in FIG. 3 mostly utilizing signal-to-noise-ratio (SNR) knowledge for selection of the most appropriate modulation and coding scheme (MCS). To get this SNR estimate, data transmission needs to occur within the coherence time of the channel. If the value of MCS is outdated, the MCS needs to be set to its initial state 34, for which several strategies may be used, e.g., the lowest MCS to guarantee the correct signal reception. Afterwards, the MCS index is adapted iteratively based on the Bit Error Rate (BER) values.

Figure 4:
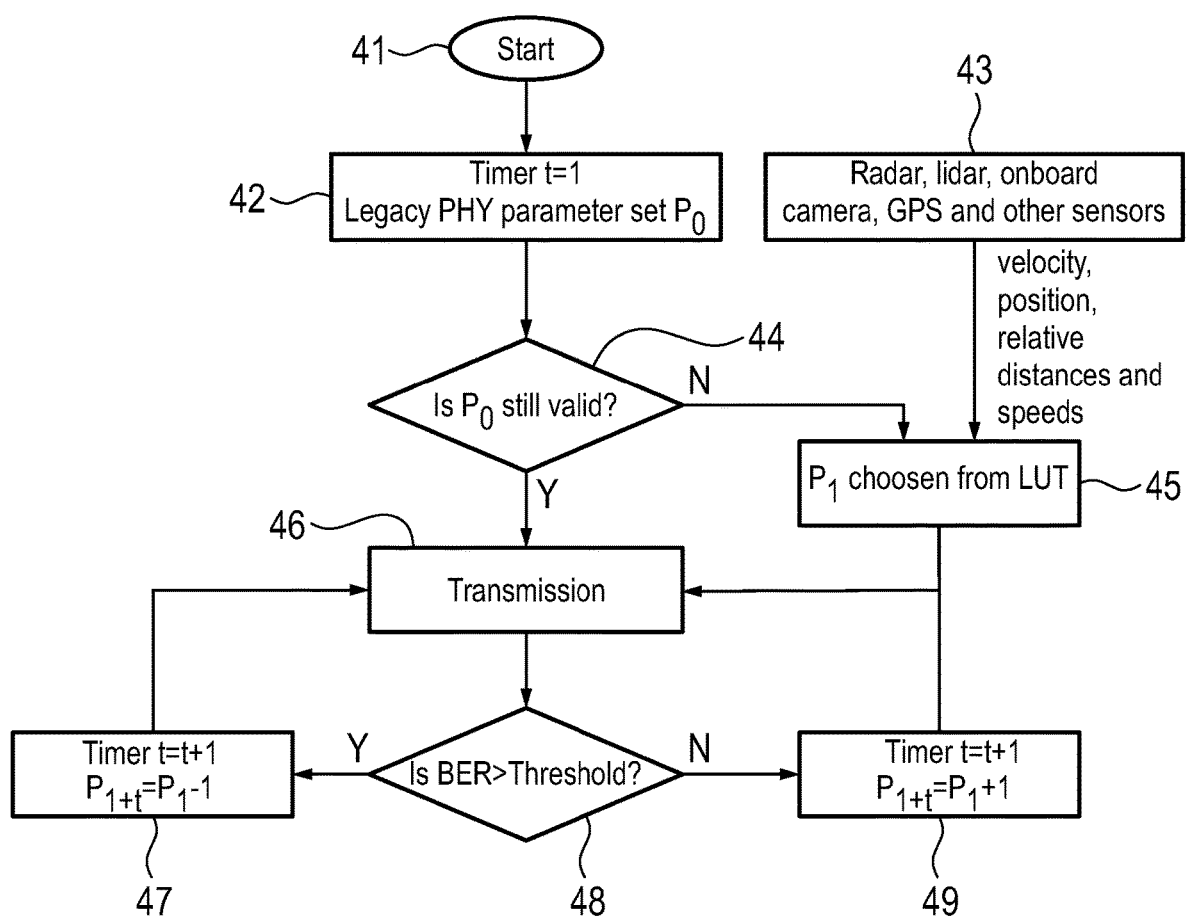
FIG. 4 shows a flowchart of a disclosed method for selecting a physical layer configuration in an exemplary embodiment.

FIG. 4 shows a flowchart of a method for selecting a physical layer configuration in an exemplary embodiment. The method starts in operation at 41. In operation at 42 a timer t=1 is set and a legacy parameter set P0 is selected. In operation at 44 it is checked if P0 is still valid. If so, transmission is carried out in operation at 46. If not, another parameter set P1 is chosen from a look-up table (LUT) in operation at 45. This selection is further based on radar, lidar, onboard camera, GPS and other sensor data determined in operation at 43 (e.g., further determining velocity, position, relative speeds and distances). In operation at 46 transmission is then carried out based on P1. In operation at 48 BER is evaluated against a threshold. If BER is above the threshold 48 (too many errors) the timer is increased t=t+1 and the next P1+t is set to P1−1 (more robust MCS) in operation at 47. If BER is below the threshold 48 (more errors affordable) the timer is increased t=t+1 and the next P1+t is set to P1+1 (higher spectral efficiency) in operation at 49.

The disclosed embodiment as shown in FIG. 4, not only adapts MCS, but a complete set of physical layer parameters (P) listed above. Moreover, the initial parameter set is chosen based on the knowledge of actual parameters of the environment. The iterative procedure based on BER serves for fine tracking of the PHY parameter set. For example, the physical layer configuration is an initial physical layer configuration and the method 10 further comprises fine tuning 46, 47, 48, 49 the physical layer configuration during communication on the radio link. The physical layer configuration P1 may be a random access configuration.

The properties and features mentioned and described together with one or more of the previously detailed examples and figures, may as well be combined with one or more of the other examples to replace a like feature of the other example or to additionally introduce the feature to the other example.

Examples may further be or relate to a computer program having a program code for performing one or more of the above methods, when the computer program is executed on a computer or processor. Actions, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. Furthermore, all examples recited herein are principally intended expressly to be only for illustrative purposes to aid the reader in understanding the principles of the disclosure and the concepts contributed to furthering the art. All statements herein reciting principles, properties, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a signal", "means for generating a signal.", etc., may be implemented as dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or actions, which may, for instance, be substantially represented in computer readable medium and so executed by a computer or processor, whether or not such computer or processor is explicitly shown. Methods disclosed in the specification or in the claims may be implemented by a device having a method or mechanism for performing each of the respective acts of these methods.

It is to be understood that the disclosure of multiple acts, processes, operations, actions, or functions disclosed in the specification or claims may not be construed as to be within the specific order, unless explicitly or implicitly stated otherwise, for instance, for technical reasons. Therefore, the disclosure of multiple acts or functions will not limit these to a particular order unless such acts or functions are not interchangeable for technical reasons. Furthermore, in some examples a single act, function, process, operation or action may include or may be broken into multiple sub-acts, -functions, -processes, -operations or -action, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

LIST OF REFERENCE SIGNS

10 Method for determining a physical layer configuration for a radio link at a first transceiver to communicate with a second transceiver via the radio link
12 obtaining information related to an environment and a state of movement of the first and second transceivers
14 estimating a radio condition of the radio link based on the information related to the environment and the state of movement of the first and second transceivers
16 determining the physical layer configuration for the radio link based on the radio condition
20 apparatus for determining a physical layer configuration for a radio link at a first transceiver to communicate with a second transceiver via the radio link
22 transmitter module
24 control module
31 Start
32 legacy setting
33 is setting valid?
34 initial setting
35 transmission
36 MCS decrease
37 BER<threshold
38 MCS increase
41 Start
42 legacy setting
43 sensor data.
44 is setting valid?
45 $P_1$ chosen from LUT
46 transmission
47 MCS decrease
48 BER<threshold 49 MCS increase
100 first transceiver
200 second transceiver
300 communication system.

What is claimed is:

1. A method for determining a physical layer configuration for a radio link at a first transceiver to communicate with a second transceiver via the radio link, the method comprising:
obtaining information related to an environment and a state of movement of the first and second transceivers by evaluating an environmental model of the first transceiver using sensor data indicative of the surroundings of a transportation vehicle including the first transceiver, wherein the sensor data is generated by sensors included in the transportation vehicle;
estimating a radio condition of the radio link based on the information related to the environment and the state of movement of the first and second transceivers by estimating a Doppler shift based on a relative movement between the first and the second transceivers;
determining the physical layer configuration for the radio link based on the estimated radio condition;
setting a density of pilots used for channel estimation in time and frequency domain based on the estimated Doppler shift; and
setting a plurality of the following for the radio link based on the estimated Doppler shift to adapt the physical layer configuration to be specific to communication between the first and second transceiver as a transceiver pair:
a density configuration of reference symbols for the physical layer configuration,
subcarrier spacing,
time-slot duration,
modulation order,
forward error correction code parameters, and
code rate.

2. The method of claim 1, wherein the information related to the environment and the state of movement of the first and second transceivers comprises an environmental map of the first transceiver.

3. The method of claim 1, wherein the obtaining of the information related to the environment and the state of movement of the first and second transceivers comprises receiving broadcast messages from traffic participants in surroundings of the transportation vehicle.

4. The method of claim 1, wherein the information related to the environment and the state of movement of the first and second transceivers comprises at least one of:
positions of the first and second transceivers,
a relative speed difference between the first and second transceivers,
a distance between the first and second transceivers, and
distances to other transceivers and/or other physical objects.

5. The method of claim 1, wherein the physical layer configuration comprises at least one of a subcarrier spacing, a pilot symbol configuration in time and/or frequency, a time slot duration, a modulation order, and coding parameters.

6. The method of claim 1, wherein the physical layer configuration is an initial physical layer configuration and wherein the method further comprises fine tuning the physical layer configuration during subsequent communication on the radio link.

7. The method of claim 1, wherein the physical layer configuration is a random access configuration.

8. The method of claim 1, wherein the the second transceiver is a transportation vehicle or infrastructure of a mobile communication system.

9. A non-transitory computer readable medium including a computer program having a program code for performing the method of claim 1, when the computer program is executed on a computer, a processor, or a programmable hardware component.

10. An apparatus for determining a physical layer configuration for a radio link for a first transceiver to communicate with a second transceiver via the radio link, the apparatus comprising:
a transmitter module for communicating with the second transceiver; and
a control module configured to:
control the transmitter module;
obtain information related to an environment and a state of movement of the first and second transceivers by evaluating an environmental model of the first transceiver using sensor data indicative of the surroundings of a transportation vehicle including the first transceiver, wherein the sensor data is generated by sensors included in the transportation vehicle;
estimate a radio condition of the radio link based on the information related to the environment and the state of movement of the first and second transceivers by estimating a Doppler shift based on a relative movement between the first and the second transceivers;
determine the physical layer configuration for the radio link based on the estimated radio condition;
set a density of pilots used for channel estimation in time and frequency domain based on the estimated Doppler shift; and
set a plurality of the following for the radio link based on the estimated Doppler shift to adapt the physical layer configuration to be specific to communication between the first and second transceiver as a transceiver pair:
a density configuration of reference symbols for the physical layer configuration,
subcarrier spacing,
time-slot duration,
modulation order,
forward error correction code parameters, and
code rate.

11. A transportation vehicle comprising an apparatus for determining a physical layer configuration for a radio link for a first transceiver to communicate with a second transceiver via the radio link, the apparatus including:
a transmitter module for communicating with the second transceiver; and
a control module configured to:
control the transmitter module;
obtain information related to an environment and a state of movement of the first and second transceivers by evaluating an environmental model of the first transceiver using sensor data indicative of the surroundings of the transportation vehicle including the first transceiver, wherein the sensor data is generated by sensors included in the transportation vehicle;
estimate a radio condition of the radio link based on the information related to the environment and the state of movement of the first and second transceivers by estimating a Doppler shift based on a relative movement between the first and the second transceivers;
determine the physical layer configuration for the radio link based on the estimated radio condition;

set a density of pilots used for channel estimation in time and frequency domain based on the estimated Doppler shift; and set a plurality of the following for the radio link based on the estimated Doppler shift to adapt the physical layer configuration to be specific to communication between the first and second transceiver as a transceiver pair:
- a density configuration of reference symbols for the physical layer configuration,
- subcarrier spacing,
- time-slot duration,
- modulation order,
- forward error correction code parameters, and
- code rate.

12. An infrastructure of a mobile communication system comprising the second transceiver of claim 10, wherein the second transceiver communicates with the first transceiver on the radio link having the physical layer configuration determined based on the radio condition estimated by the apparatus.

13. The apparatus of claim 10, wherein the information related to the environment and the state of movement of the first and second transceivers is also obtained by receiving broadcast messages from traffic participants.

14. The apparatus of claim 10, wherein the information related to the environment and the state of movement of the first and second transceivers comprises:
- an environmental map of the first transceiver; or
- at least one of the positions of the first and second transceivers, a relative speed difference between the first and second transceivers, a distance between the first and second transceivers, and distances to other transceivers and/or other physical objects.

15. The apparatus of claim 10, wherein the physical layer configuration comprises at least one of a subcarrier spacing, a pilot symbol configuration in time and/or frequency, a time slot duration, a modulation order, and coding parameters.

16. The apparatus of claim 10, wherein the physical layer configuration is an initial physical layer configuration and wherein fine tuning of the physical layer configuration is performed during subsequent communication on the radio link.

17. The apparatus of claim 10, wherein the physical layer configuration is a random access configuration.

18. The apparatus of claim 10, wherein the first transceiver is a transportation vehicle and the second transceiver is a transportation vehicle or infrastructure of a mobile communication system.

\* \* \* \* \*